United States Patent Office 3,438,982
Patented Apr. 15, 1969

3,438,982
PHTHALOYLPHENOTHIAZINE COMPOUNDS
James M. Straley and David J. Wallace, Kingsport, Tenn., assignors to Eastman Kodak Company, Rochester, N.Y., a corporation of New Jersey
No Drawing. Continuation-in-part of applications Ser. No. 502,339 and Ser. No. 502,340, Oct. 22, 1965. This application May 15, 1967, Ser. No. 638,597
Int. Cl. C07d 93/14; C07c 87/28; D06p 1/20
U.S. Cl. 260—243    8 Claims

ABSTRACT OF THE DISCLOSURE

Novel compounds having a phthaloylphenothiazine nucleus are useful as dyes for hydrophobic fibers.

This application is a continuation-in-part of our co-pending U.S. applications Ser. Nos. 502,339 and 502,340 both of which were filed Oct. 22, 1965, and are now abandoned, for Phthaloylphenothiazine Dyes for Textile Fibers.

This invention relates to certain novel phthaloylphenothiazine compounds and, more particularly, to water-insoluble phthaloylphenothiazine compounds useful as dyes for hydrophobic textile materials and to such textile materials dyed with the novel compounds.

The phthaloylphenothiazine compounds of the invention are characterized by the general formula:

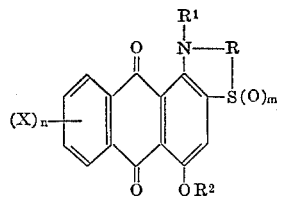

wherein

R represents an o-phenylene radical;
$R^1$ and $R^2$ are the same or different and each represents a lower alkyl radical or hydrogen except that, when $m=0$, $R^1$ and $R^2$ are not both hydrogen;
X represents hydrogen, lower alkyl, lower alkoxy, hydroxy, or halogen;
$m$ represents 0, 1 or 2; and
$n$ represents 1, 2, 3 or 4.

The novel compounds of the invention give bright red to blue dyeings of excellent fastness properties on hydrophobic textile materials such as cellulose acetate, polyamide and, especially, polyester fibers. The compounds can be applied to the described textile materials by well known techniques.

Examples of the o-phenylene radicals that R represents include o-phenylene, 4-methyl-2-phenylene, 4-ethoxy-2-phenylene, 3-methoxy-2-phenylene, 3 - propoxy-2-phenylene, 3-β-hydroxyethyl-2-phenylene, 4-ethylthio-2-phenylene, 3-methyl-5-chloro-2-phenylene, 4-bromo-2-phenylene, 4-nitro-2-phenylene, etc. Preferred o-phenylene radicals represented by R have the general formula

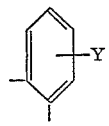

wherein Y represents hydrogen, lower alkyl, e.g. methyl, ethyl, butyl; substituted lower alkyl such as haloalkyl, e.g. β-chloroethyl, gamma-bromopropyl, trifluoromethyl, cyanoalkyl, e.g. β-cyanoethyl, nitroalkyl, e.g. β-nitroethyl, hydroxyalkyl, e.g. β-hydroxyethyl; alkoxyalkyl, e.g. β-methoxyethyl; phenoxyalkyl, e.g. β-phenoxethyl; lower alkanoylamino, e.g. acetamido; halogen, e.g. chlorobromo; cyano; lower alkylsulfonyl, e.g. methylsulfonyl; substituted lower alkylsulfonyl, e.g. cyanoethylsulfonyl; aryl; e.g. phenyl; benzamido; lower alkoxycarbonyl, e.g. ethoxycarbonyl, sulfamoyl; N-lower alkyl sulfamoyl, e.g. N-ethylsulfamoyl; lower alkylsulfonamido, e.g. methylsulfonamido; thiocyanato; lower alkylthio, e.g. methylthio, cyanoalkylthio, e.g. β-cyanoethylthio; arylthio, e.g. phenylthio; cycloalkylthio, e.g. cyclohexylthio, etc. As used in the above description and hereinafter, the term lower is used in its conventional sense to mean an alkyl moiety having up to about 4 carbon atoms.

The lower alkyl radicals represented by each of $R^1$ and $R^2$ can be straight or branched chain, unsubstituted or substituted alkyl of up to about 4 carbon atoms. Typical alkyl radicals represented by $R^2$ are methyl, ethyl, propyl, isopropyl, butyl, hydroxyalkyl, e.g. β-hydroxyethyl, polyhydroxyalkyl, e.g. 2,3-dihydroxypropyl, lower alkoxyalkyl, e.g. β-methoxyethyl, nitroalkyl, e.g. β-nitroethyl, cyanoalkyl, e.g. β-cyanoethyl, cyanoalkoxyalkyl, e.g. β-cyanoethoxyethyl, lower alkanoyloxyalkyl, e.g. β-acetoxyethyl, lower alkoxycarbonyl, e.g. β-ethoxycarbonylethyl, haloalkyl, e.g. β-chloroethyl, gamma-chloropropyl, β-bromoethyl, hydroxyhalogenoalkyl, e.g. gamma-chloro-β-hydroxypropyl, lower alkanoylamidoalkyl, e.g. β-acetamidoethyl, carbamoylalkyl, e.g. β-carbamoylethyl, N-lower alkylcarbamoylalkyl, e.g. β-N-methylcarbamoylethyl; N - phenylcarbamoyloxyalkyl, e.g. β-N-phenylcarbamoylethyl; lower alkylsulfonylalkyl, e.g. β-methylsulfonylethyl, aryl, e.g. benzoyl; benzoloxy, phenoxyalkyl, e.g. β-phenoxyethyl; lower alkylsulfonamidoalkyl, e.g. methylsulfonamidoethyl; N-phenylcarbamoyloxy; etc. When the alkyl group is substituted by a carbon containing substituent, e.g. alkoxy, the perferred substituted alkyl group can contain up to about 8 carbon atoms, e.g. delta-butoxybutyl.

Examples of the lower alkyl, lower alkoxy, and hydroxy groups and halogen atoms that X can represent are described above in the definitions of R, $R^1$ and $R^2$. When $n$ is greater than one, the substituents represented by X can be the same or different. Preferably $(X)_n$ represents hydrogen or one or two substituents, i.e. $n$ represents 1 or 2.

As is well known in the art, the primary color of the novel compounds of the invention is attributable to the nucleus

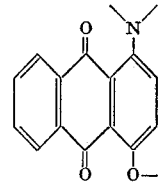

The particular groups represented by R, $R^1$, $R^2$ and X, as defined above, do not materially affect the ability of the compounds to dye the above described textile materials. The substituents, if any, that are present on the o-phenylene radical represented by R and on the alkyl radicals represented by $R^1$ and $R^2$ and the groups represented by X serve primarily as auxochrome groups to vary the shade of the compounds. The novel structure of the compounds of the invention renders them chemically distinct from other known dyes. For example, the compounds exhibit excellent affinity for and fastness properties on the textile materials described above.

The phthaloylphenothiazine compounds of the invention in which $m=0$ are prepared by the reaction of the corresponding phthaloylphenothiazine with an alkylating agent. Examples of the alkylating agents useful in preparing the novel compounds include the lower alkyl sulfates and the lower alkyl-p-toluene-sulfonates. The compounds can also be obtained by reacting the appropriate phthaloylphenothiazine with a halohydrin which can be followed by treating the product with a halogenating agent such as phosphorus oxychloride.

The phthaloylphenothiazine compounds used in the above described preparation of the compounds of the invention are prepared by methods well known in the art. A leucoquinizarin, quinizarin or a 2-haloquinizarin, e.g. 2-bromoquinizarin or 2-chloroquinizarin, can be condensed with an o-aminobenzenethiol. The o-aminobenzenethiols used in the preparation of the intermediate phthaloylphenothiazines are well known in the art and can be prepared by conventional methods.

The phthaloylphenothiazine compounds of the invention wherein $m$ is 1 or 2 are prepared by oxidizing the corresponding compounds in which $m$ is 0. The oxidation can be carried out according to art known methods, for example, using hydrogen peroxide. The product obtained from the oxidation of the phthaloylphenothiazines usually consists essentially of the sulfone derivative, i.e. where $m=2$, with a minor portion of the product being the sulfoxide, i.e. $m=1$. It is apparent that the reaction condition can be varied so that a larger proportion of the product is the sulfoxide compound. In the following examples describing the preparation of the oxidized phthaloylphenothiazine, only the sulfone derivatives are described. However, it is to be understood that the product can also contain the sulfoxide compounds which are, therefore, to be considered within the scope of the invention. The sulfoxide and sulfone compounds can be separated if desired and used as dyes in their purified state. Separation can be accomplished by well known means, for example, by thin layer chromatography and recrystallization from selective solvents. However, the mixture of the 2 forms can be used with excellent results to dye the above described textile materials.

The following examples will further illustrate the preparation of the compounds of the invention.

EXAMPLE 1

An amount of 3.45 g. 4-hydroxy-2,3-phthaloylphenothiazine, 3.45 g. K$_2$CO$_3$, and 25 ml. trichlorobenzene is heated and stirred at 180° C. to remove any water formed and 5.6 g. methyl-p-toluenesulfonate are added. Heating is continued at 160–170° for 8 hr. and the reaction mixture is then cooled to room temperature, filtered, washed with methanol and then with water and dried. The product dyes polyester fibers a bright blue color and has the structure:

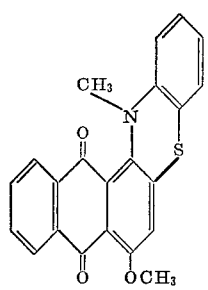

EXAMPLE 2

Utilizing the procedures, reactants and concentrations of Example 1, a dye is prepared substituting ethyl-p-toluene-sulfonate for the methyl ester used in Example 1.

The product dyes polyester fibers blue and has the structure:

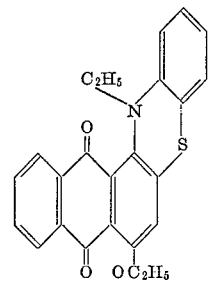

EXAMPLE 3

Utilizing the procedures, reactants and concentrations of Example 1, a dye is prepared substituting n-propyl-p-toluene-sulfonate in place of the methyl ester of Example 1. The product dyes polyester fibers blue and has the structure:

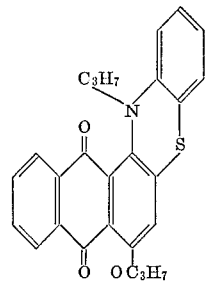

EXAMPLE 4

Utilizing the procedures, reactants and concentrations of Example 1, a dye is prepared substituting n-butyl-p-toluene-sulfonate for the methyl ester and 4-hydroxy-2,3-(5'-chlorophthaloyl)phenothiazine for the non-halo-substituted compound of Example 1. The product gives blue dyeings on polyesters and has the structure:

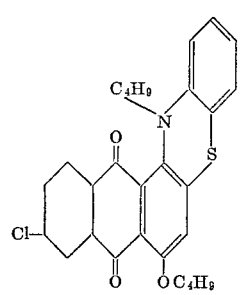

EXAMPLE 5

An amount of 2 g. 4-hydroxy-2,3-(3',6'-dihydroxyphthaloyl)phenothiazine, 2 g. ethylene chlorohydrin, and 0.5 g. potassium acetate are stirred and refluxed for 7 hr. The reaction mixture is cooled overnight, filtered, and the cake washed with water and dried. The product dyes polyester fibers a bright blue. The product has the structure:

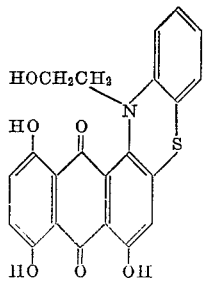

EXAMPLE 6

Reaction of the product of Example 5 with POCl₃ at reflux results in a dye which colors polyesters bright blue shades. The dye has the structure:

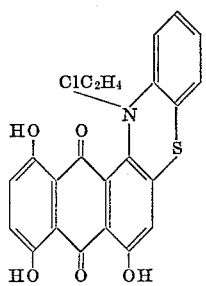

EXAMPLE 7

In accordance with the procedure of Example 1, 4-hydroxy-2,3-(6'-chlorophthaloyl)phenothiazine is reacted with ethyl-p-toluenesulfonate to obtain a product which gives bright blue dyings on polyesters. It has the structure:

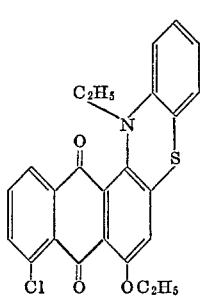

EXAMPLE 8

In accordance with the procedure of Example 1, 4-hydroxy-2,3-(5'-chlorophthaloyl)phenothiazine is reacted with butyl-p-toluenesulfonate to obtain a product which gives fast blue colorings on polyester fibers. The dye has the structure:

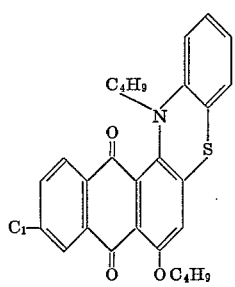

The compounds described in the Examples of Table I are prepared according to the procedure described in the preceding examples. The compounds conform to the following general formula:

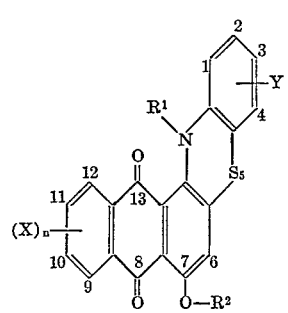

TABLE I

| Example | R¹ | R² | (X)ₙ | Y |
|---|---|---|---|---|
| 9 | ClC₂H₄— | ClCH₂CH₂— | H | H |
| 10 | CH₃COOC₂H₄— | H | 9,12-di-OH | 1-CH₃ |
| 11 | CNC₂H₄— | CNC₂H₄— | H | H |
| 12 | CH₃OC₂H₄— | CH₃OC₂H₄— | H | H |
| 13 | C₂H₅— | C₂H₅— | 9,12-di-OH | 3-Cl |
| 14 | CH₃— | CH₃— | H | 3-SCH₃ |
| 15 | CH₃CONHC₃H₆— | H | H | 3-SO₂CH₃ |
| 16 | CH₃SO₂NHC₃H₆— | H | H | 3-NO₂ |
| 17 | C₄H₉— | C₄H₉— | 10-Cl | 3-SO₂NH₂ |
| 18 | CH₃— | CH₃— | 10-OCH₃ | 2-CH₃ |

EXAMPLE 19

An amount of 0.5 g. 1-methyl-4-methoxy-2,3-phthaloylphenothiazine, 5 ml. 30 percent aqueous H₂O₂, and 100 ml. glacial acetic acid are heated in the steam bath 1.5 hr., cooled to room temperature, filtered, washed with acetic acid and dried. The product dyes polyester fibers pink colors of outstanding fastness properties. This dye has the following structure:

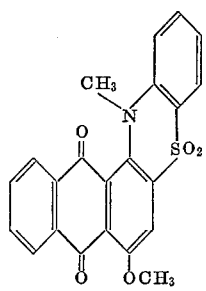

EXAMPLE 20

One g. of 4-hydroxy-2,3-phthaloylphenothiazine, 5 ml. of 30 percent aqueous hydrogen peroxide, and 100 ml. of glacial acetic acid are heated at steam-bath temperature for 1.5 hr., then cooled, filtered, washed with acetic acid, and dried. The product dyes polyester fibers violet shades of excellent fastness properties. It has the structure:

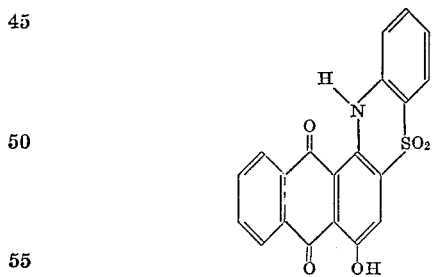

EXAMPLE 21

One g. of 1-hydroxyethyl-2,3-phthaloylphenothiazine is oxidized in accordance with the procedure of Example 19. The product dyes polyester fibers a violet shade and has the structure:

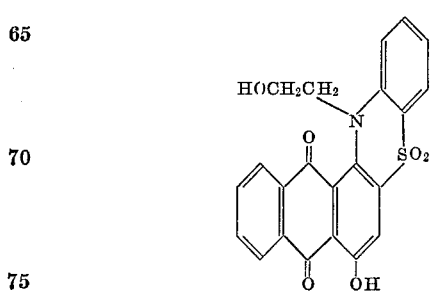

EXAMPLE 22

One g. of 1-n-butyl-4-butoxy-2,3-phthaloylphenothiazine is oxidized in accordance with the procedure of Example 19. The product dyes polyester fibers a pink shade and has the structure:

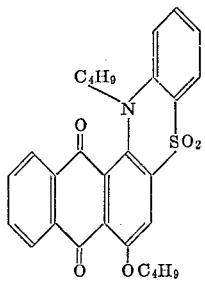

EXAMPLE 23

One g. of 3'-chloro-4-hydroxy-2,3-phthaloylphenothiazine is oxidized in accordance with the procedure of Example 19. The product dyes polyester fibers violet and has the structure:

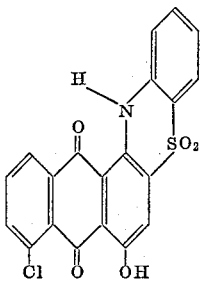

The oxidized compounds described in Table II are prepared by the procedure described in Examples 19 and 20. The compounds correspond to the general formula

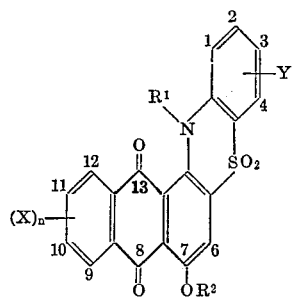

The color given for each of the compounds refers to dyeings on polyester fibers.

The water-insoluble phtholoylphenothiazine compounds of the invention can be used for dyeing textile materials, including protein and synthetic polymer fibers, yarns and fabrics, giving a variety of fast brilliant pink to violet shades when applied thereto by conventional dye methods. The compounds have good affinity for cellulose ester, polyester and nylon fibers. Since the phthaloylphenothiazine compounds are used for dyeing such hydrophobic materials, they should be free of water-solubilizing groups such as sulfo and carboxyl. In general, the compounds of the invention have excellent fastness, for example, to light, washing, gas (atmospheric fumes) and sublimation. The compounds display particularly good fastness properties on polyester fibers when applied thereto by the thermal fixation technique of dyeing.

The compounds of the invention can be used for dyeing hydrophobic fibers such as linear polyester, cellulose ester, polyamide, etc., fibers in the manner described in U.S. Patents 2,880,050, 2,782,187, 2,757,064 and 3,043,827. The following example illustrates a method by which the compounds of the invention can be used to dye hydrophobic textile materials.

EXAMPLE 35

0.1 g. of the dye is dissolved in the dye pot by warming in 5 cc. of ethylene glycol monomethyl ether. A 2 percent sodium-N-methyl-N-oleyl taurate and 0.5 percent sodium lignin sulfonate aqueous solution is added, with stirring, until a fine emulsion is obtained. Water is then slowly added to a total volume of 200 cc. Then, 3 cc. of "Dacronyx" (a chlorinated benzene emulsion are added and 10 grams of a textile fabric made of poly(ethylene terephthalate) polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2 percent soap, 0.2 percent soda ash solution. After scouring, the fabric is rinsed with water and dried. When the compounds are used to dye polyamide textile materials, the above described procedure can be employed except the "Dacronyx" dyeing assistant need not be used.

The compounds of the invention can also be applied to polyester textile materials by the heat fixation technique of dyeing. This technique of dyeing is the preferred method of applying the oxidized compounds, i.e. $m=1$ or 2, to the polyester fibers. This procedure is described in U.S. Patent 2,663,612 and in the American Dyestuff Reporter, 42, 1 (1953).

Polymeric linear polyester materials of the terephthalate type are illustrative of the linear aromatic polyester textile materials that can be dyed with the new compounds of our invention. Examples of such linear polyester materials are those prepared from ethylene glycol and dimethylterephthalate and those prepared from 1,4-cyclohexanedimethanol and dimethylterephthalate. Polyester textile materials prepared from 1,4-cyclohexanedimethanol and dimethylterephthalate are more particularly described in

TABLE II

| Ex. | $R^1$ | $R^2$ | $(X)_n$ | Y | Color |
|---|---|---|---|---|---|
| 24 | H | H | 9,12-di-OH | None | Violet. |
| 25 | —$CH_3$ | H | None | do | Do. |
| 26 | —$CH_2CH_2OH$ | H | do | do | Do. |
| 27 | —$CH_2CH_2CN$ | H | do | 3-$CH_2CH_2OH$ | Do. |
| 28 | —$C_4H_9$ | H | do | 3-$SO_2NH_2$ | Do. |
| 29 | —$C_4H_9$ | —$C_4H_9$ | do | 3-$SO_2CH_3$ | Pink. |
| 30 | —$CH_2CH_2OH$ | —$CH_3$ | do | 2-$NO_2$ | Do. |
| 31 | —$CH_3$ | —$CH_3$ | 3-Cl | 4-$OCH_3$ | Violet. |
| 32 | —$CH_3$ | —$CH_3$ | 9,10,11,12-tetra-Cl | 4-$CH_3$ | Red. |
| 33 | —$CH_3$ | H | 9,12-di-OH | 4-Cl | Violet. |
| 34 | —$CH_3$ | —$CH_3$ | 9,12-di-$OCH_3$ | 4-$SCH_3$ | Pink. |

U.S. Patent 2,901,446. Poly(ethylene terephthalate) fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Examples of the polyamide fibers that can be dyed with the compounds of the invention are those consisting of nylon 66, made by the polymerization of adipic acid and hexamethylenediamine, nylon 6, prepared from epsilon-aminocaproic acid lactam, and nylon 8.

The invention has been described in considerable detail with particular reference to certain preferred embodiments thereof, but it will be understood that variations and modifications can be effected within the spirit and scope of the invention as described above and as defined in the appended claims.

We claim:

1. A water-insoluble compound having the formula

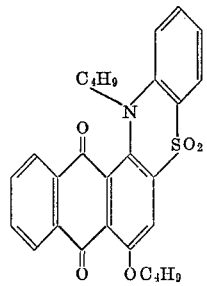

wherein
$R^1$ and $R^2$ are the same or different and each represents hydrogen, lower alkyl, β-hydroxyethyl, β-lower alkoxyethyl, β-cyanoethyl, β-lower alkanoyloxyethyl, β-chloroethyl, β-bromoethyl, γ-chloropropyl, γ-bromopropyl, γ-chloro-β-hydroxypropyl, β-lower alkanoylamidoethyl, γ-lower alkanoylamidopropyl, β-lower alkylsulfonamidoethyl, γ-lower alkylsulfonamidopropyl, or β-lower alkoxycarbonylethyl;
X represents hydrogen, lower alkyl, lower alkoxy, hydroxy, chlorine or bromine;
$n$ represents 1, 2, 3 or 4; and
Y represents hydrogen, lower alkyl, lower alkoxy, lower alkylthio, lower alkylsulfonyl, nitro, sulfamoyl, lower alkanoylamino, chlorine, bromine, cyano, lower alkylsulfonyl, benzamido, lower alkoxycarbonyl, lower alkylsulfonamido, thiocyanato, lower alkylthio, phenylthio, or cyclohexylthio.

2. A compound according to claim 1 wherein $R^1$ and $R^2$ are the same or different and each represents hydrogen, lower alkyl, β-hydroxyethyl, β-lower alkoxyethyl, β-cyanoethyl, β-lower alkanoyloxyethyl, β-chloroethyl, β-bromoethyl, γ-chloropropyl, γ-bromopropyl, γ-chloro-β-hydroxypropyl, β-lower alkanoylamidoethyl, γ-lower alkanoylamidopropyl, β-lower alkylsulfonamidoethyl, or γ-lower alkylsulfonamidopropyl;
X represents hydrogen, chlorine, bromine, or hydroxy;
$n$ represents 1 or 2; and
Y represents hydrogen, lower alkyl, lower alkoxy, lower alkylthio, lower alkylsulfonyl, nitro, or sulfamoyl.

3. A compound according to claim 1 wherein
X and Y each represents hydrogen; and
$R^1$ and $R^2$ each represents hydrogen or lower alkyl.

4. A compound having the formula

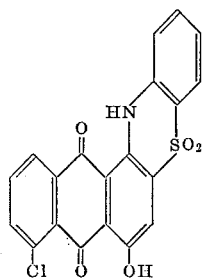

5. A compound having the formula:

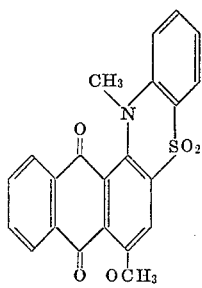

6. A compound having the formula:

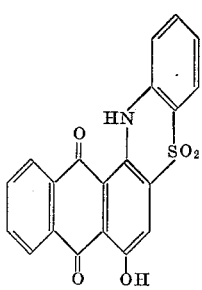

7. A compound having the formula:

8. A compound having the formula:
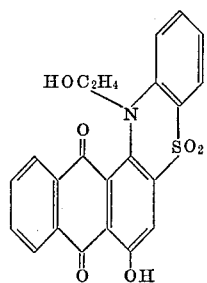
References Cited
UNITED STATES PATENTS
2,338,516  1/1944  Kern et al. _____ 260—327
FOREIGN PATENTS
1,343,177  10/1963  France.
OTHER REFERENCES
Ullman et al., Berichte, vol. 49, pp. 2154–55, 2163–65 (1916).
NORMA S. MILESTONE, *Primary Examiner.*
HARRY J. MOATZ, *Assistant Examiner.*
U.S. Cl. X.R.
260—454, 465, 471, 556, 558, 562, 578; 8—39